US007001549B1

(12) United States Patent
Stieler

(10) Patent No.: US 7,001,549 B1
(45) Date of Patent: Feb. 21, 2006

(54) METHOD FOR PRODUCING PHYSICALLY FOAMED INJECTION MOULDED PARTS

(76) Inventor: Ulrich Stieler, Fontaneweg 1, Goslar D-38642 (DE)

( * ) Notice: Subject to any disclaimer, the term of this patent is extended or adjusted under 35 U.S.C. 154(b) by 0 days.

(21) Appl. No.: 09/936,756

(22) PCT Filed: Mar. 15, 2000

(86) PCT No.: PCT/EP00/02258

§ 371 (c)(1),
(2), (4) Date: Sep. 17, 2001

(87) PCT Pub. No.: WO00/54952

PCT Pub. Date: Sep. 21, 2000

(30) Foreign Application Priority Data

Mar. 15, 1999 (DE) .................................. 199 11 378

(51) Int. Cl.
*B29C 44/06* (2006.01)
*B29C 44/60* (2006.01)

(52) U.S. Cl. .................... 264/45.1; 264/50; 264/53; 425/4 R; 425/146; 425/149

(58) Field of Classification Search ............... 264/50, 264/51, 45.5, 572, 45.1, 53; 425/135, 145, 425/4 R, 146, 149
See application file for complete search history.

(56) References Cited

U.S. PATENT DOCUMENTS

| 3,268,636 | A | * | 8/1966 | Angell, Jr. .................... 264/51 |
| 4,129,635 | A | * | 12/1978 | Yasuike et al. ............. 264/45.5 |
| 4,134,687 | A | * | 1/1979 | Eckardt ........................ 366/76 |
| 4,136,220 | A | * | 1/1979 | Olabisi ......................... 428/35 |
| 4,255,367 | A | * | 3/1981 | Wallace et al. ............ 264/45.1 |
| 4,314,835 | A | * | 2/1982 | Pelton ........................... 65/22 |
| 4,344,710 | A | * | 8/1982 | Johnson et al. .............. 366/76 |
| 4,474,717 | A | * | 10/1984 | Hendry ..................... 264/45.5 |
| 4,548,776 | A |   | 10/1985 | Holdredge, Jr. |
| 4,824,732 | A | * | 4/1989 | Hendry et al. ........... 428/542.8 |
| 5,093,053 | A | * | 3/1992 | Eckardt et al. ............ 264/45.1 |

FOREIGN PATENT DOCUMENTS

| DE | 1 948 454    |    | 1/1971  |
| DE | 1 778 457    |    | 9/1971  |
| DE | 196 46 665 A1 |   | 5/1998  |
| DE | 198 26 363 A1 |   | 12/1999 |
| EP | 0 570 221 A2 |    | 11/1993 |
| EP | 0 664 197 B1 |    | 7/1995  |
| EP | 0 765 724 A2 |    | 2/1997  |
| GB | 1 333 587    |    | 10/1973 |
| GB | 2 053 777    | *  | 2/1981  |

* cited by examiner

*Primary Examiner*—Allan R. Kuhns
(74) *Attorney, Agent, or Firm*—Salter & Michaelson

(57) ABSTRACT

A process for producing physically foamed injection molded articles is provided. The process involves feeding a propellant-free thermoplastic melt into a cavity followed by delivering a physical propellant directly into the cavity or directly into the melt flowing into the cavity. The pressure exerted on the propellant during the injection stage is greater than that exerted on the propellant during the holding phase.

28 Claims, 6 Drawing Sheets

FIG. 4c
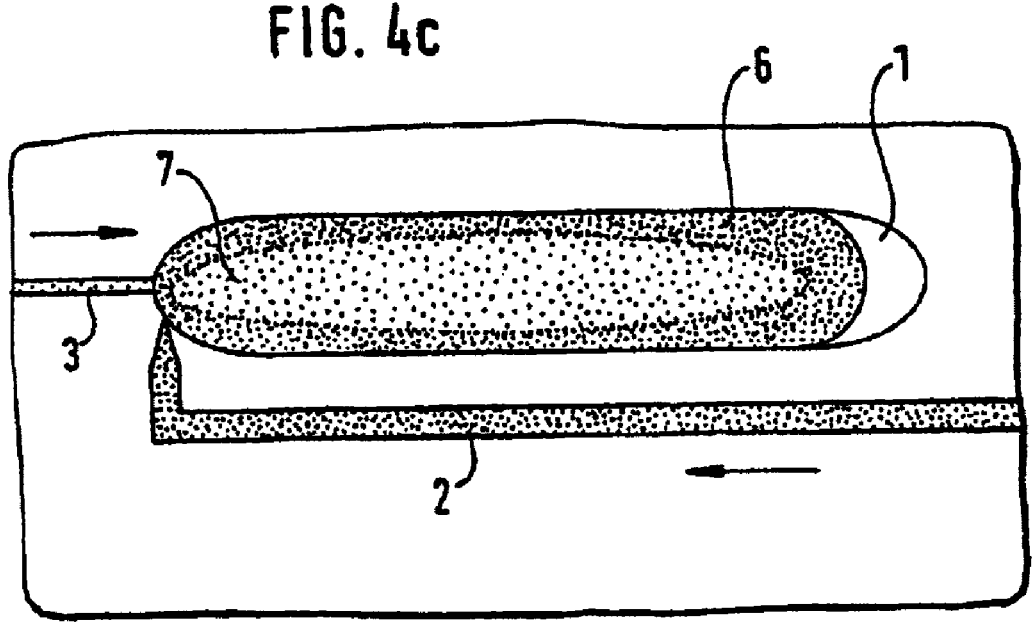
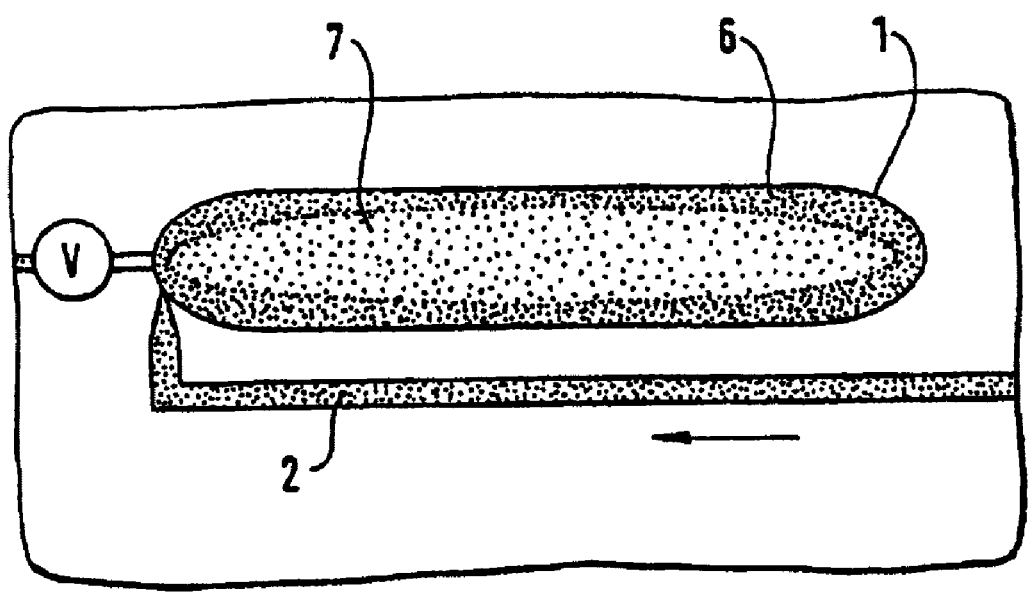
FIG. 4d

METHOD FOR PRODUCING PHYSICALLY FOAMED INJECTION MOULDED PARTS

The present invention relates to a process for the production of physically foamed injection moulded articles, in particular injection moulded articles with an internal foam structure and a compact closed-pore external skin of the same material as the base body.

The production of foamed plastics, for example, is achieved with the aid of so-called propellants, which expand a plastic, generally thermally softened plastic mass in the desired manner. In this case, the propellants are either generated in situ via chemical reaction of the components (chemical propellants), or compressed fluids, e.g. $N_2$, $CO_2$, are added under pressure to the starting material, in which case a foaming process of the plastic mass caused by the propellant is initiated upon the subsequent drop in pressure of the component mixture to normal pressure.

However, chemical propellants have a series of disadvantages. For instance, for use in foam injection moulding higher temperatures than are actually necessary for softening starting materials may have to be selected in order to reach the ignition point of the propellants, since the temperature at which the reaction of the components generating propellant starts is generally very high. Because of the high temperatures a higher expenditure of energy is necessary during melting of the raw materials. In addition, the cycle or cooling times are increased and a higher cooling power of the cooling plants is necessary. In some circumstances, damage to the raw materials may also occur as a result of the comparatively high temperatures.

Chemical propellants which have not been converted can locate on the surface of the articles obtained and cause yellowing of the articles. Allergic skin reactions may also result upon contact with these articles. Foam articles which have been obtained by means of chemical propellants are not recyclable, or if so only conditionally, since there is the risk that non-ignited propellants can lead to uncontrolled reactions during reuse.

Therefore, physical propellants are preferably used to foam plastics. Physical propellants allow optimum adaptation of the melting temperature to the respectively selected raw material, as a result of which the energy expenditure is reduced, optimum cycle and cooling times are made possible and in addition there is no risk that the raw materials could be detrimentally affected as a result of temperatures which are too high. Moreover, inexpensive gases such as $CO_2$, for example, can be used as physical propellants.

Physical propellants do not remain in the finished foam articles, but diffuse out within a comparatively short time. Therefore, these articles are fully recyclable, since there is no need to fear that propellant residues could lead to uncontrolled reactions.

Various processes are known for the production of articles from foamed plastic with a compact closed external skin and a cellular core cohering with the external skin or edge zone, also referred to as integral foam or structural foam.

For example, in the reaction injection moulding process (RIM), two reactive components are mixed together which harden and foam in the cavity of a mould under reaction. Because of the quicker cooling at the wall of the mould, the reaction mass solidifies more quickly there than in the interior of the mould, and as a result the foaming process ceases earlier there than in the mould interior, and a compact sealed external layer is formed.

As determined by the process, the reactive component mixture must be comparatively liquid in order to guarantee complete filling of the mould before the reaction starts. However, this leads to irregularities on the surface of the formed article as a result of spray over and skin formation, which necessitates expensive finishing for high-grade articles, for which a perfect surface is required.

Moreover, for the RIM process the mould must be treated with a separating agent prior to injection, which on the one hand requires more expenditure in processing and can additionally lead to residues on the finished article which must be removed. The relatively long cycle times are also disadvantageous.

Since foaming in the RIM process is generally conducted chemically, the articles to be obtained are only conditionally recyclable.

Integral foams made of polyurethane to be used as working material primarily in the automobile industry, e.g. for steering wheel casings or gearshift knobs etc., are preferably produced using the RIM process. However, for this field of application the articles must not only have as perfect a surface as possible, but also have pleasant skin feel (tactility).

It has been shown that articles of polyurethane integral foam have only a conditionally acceptable tactility.

It is also known to produce integral foams from thermoplastic urethane or thermoplastic elastomer by means of conventional injection moulding processes. Both chemical and physical propellants can be used in this case. Contrary to the RIM process, which requires special plants, already existing injection moulding plants without expensive refitting can be used for this.

The necessary finishing of the articles obtained is only slight.

DE 196 46 665 A1 describes a process for metering physical propellants, wherein a propellant is added at high pressure to the softened plastic material transported in the consuming device, e.g. an extruder or an RIM machine, and the amount of propellant is regulated with a pressure control valve, which keeps the pressure difference constant via a rigid throttle means by regulating the pressure difference in dependence on the flow of propellant. The extrusion processes described here are continuous processes in which the propellant is continuously added.

A process for the production of multilayered articles with a foamed core and a non-expanded thermoplastic external skin is known from DE 1 778 457, wherein a first propellant-free melt and a second melt containing propellant as well as possibly a third propellant-free melt are firstly prepared and injected one after the other into an appropriate mould, in which case the mould must be maintained at a temperature equal to or higher than the activation temperature of the propellant.

Where physical propellants are used, it is suggested that either the selected temperature of the melt upon leaving the nozzle is so high that, when a mould with constant internal volume is used, the gas formation, and thus the expansion, still occurs below the pressure exerted on the substance in the mould, and when a mould with extendable interior is used, the gas formation, and thus the expansion, occurs by relieving the pressure exerted on the mould interior to expand the mould. There is no mention of the propellant being added directly to the melt flow which flows into the mould, nor of the quantity of propellant apportioned to the melt flow being regulated via the pressure.

An improved process of the aforementioned type is specified in DE 1 948 454, wherein the propellant is injected into the melt flow shortly before entry into the mould and the injection period is continued until the mixture quantity required to form the core has been inserted into the mould. Solvents with a boiling point preferably between 20 and 150° C. are specified as propellants, which are to prevent premature expansion under a corresponding pressure. There is likewise no mention here of a pressure regulation of the added quantity of propellant to the melt.

A process for the production of injection molded articles with foamed core is described in U.S. Pat. No. 4,548,776, according to which gaseous or gas-generating chemical propellant is already added to the melt in the extruder, is thoroughly mixed with this and the already foamed melt is then injected into the mold.

In this case, the addition of propellant occurs via a porous insert at the injection point, a supply valve being provided in the feed pipe. This supply valve can be connected to an automatic control device, via which the pressure of the propellant to be fed is adjusted.

The object of the present invention is to provide a process for the production of physically foamed injection moulded articles, with which injection moulded articles with an integral structure, excellent surface characteristics, thus rendering expensive finishing unnecessary, and additionally excellent tactility, can be obtained in a simple manner using conventional injection moulding plants.

The articles produced according to the invention are suitable in particular for fields of application which set high quality requirements for surface structure and for which a pleasant sensory feel is of advantage on skin contact. The automobile industry is given as an example, for which handles, knobs such as gearshift knobs, steering wheel casings etc. of the foamed plastics obtained according to the invention can be used. However, the process according to the invention is in no way restricted to the production of articles for the automobile industry, but is quite generally suitable for the production of any desired foamed injection moulded articles.

For example, mass-produced articles such as closing means for bottle-like containers, e.g. stoppers or corks, may also be advantageously obtained according to this process. Further examples are balls, spheres, fenders, floats etc.

A further field of use is the production of supporting parts, for example, for the aviation or automobile industry, in particular for parts where strength is relevant.

This object is achieved according to the invention by a process for the production of physically foamed injection moulded articles, wherein firstly in a first stage a propellant-free first melt portion is fed into a cavity (initial filling), in a second stage a physical propellant is added at elevated pressure to the following melt portion (propellant injection phase), wherein metering of the physical propellant occurs at least in a pressure regulated manner, wherein the pressure which is exerted on the propellant during the propellant injection phase is greater than the pressure which is exerted on the propellant in the phases between or before or after metered addition, and the expansion of the propellant occurs in the cavity, and possibly in a third stage a propellant-free further melt portion is charged into the cavity.

This process also permits the formation of physically foamed injection moulded articles, the foamed core of which is completely or partially enclosed by a compact closed external skin, which has been produced without the addition of propellants, the core and the external skin being made of the same material.

The present invention additionally relates to a device for the metered addition of propellants under elevated pressure to an expandable melt.

This device can also be advantageously used for the metered addition of compressible propellants.

The propellant-free melt portion firstly fed into the cavity in the first stage forms a compact closed external skin without pores in the finished foamed injection moulded articles.

Any desired fluid which expands upon corresponding pressure relief and foams the melt material in a suitable manner can be used as propellant. Hence, compressible fluids such as gases in liquid or supercritical phase, for example, may be used.

The use of carbon dioxide is recommended because of its ready availability.

A further preferred propellant is water.

The starting material for the melt is not subject to any special restrictions. Any desired thermoplastic melt material which is suitable for injection moulding and can be foamed may be used.

Examples are thermoplastic materials, but also further thermoplastic melts, such as metallic or ceramic melts, for example. Examples of metallic materials include aluminium, magnesium, zinc, tin or even precious metals.

The process according to the invention leads to weight reduction and strength increase in comparison to the corresponding compact articles.

"Pressure regulated" in the sense of the invention means that in the course of the process the pressure exerted on the propellant is varied for metered addition of the propellant.

In this case the pressure exerted on the propellant during the propellant injection phase is greater than the pressure exerted on the propellant in the phases between or before or after metered addition. This means in the case of critical or compressible propellants, for example, that the pressure exerted in the intermediate cycle times is lower than the holding pressure of a pressure relief valve or overflow valve.

Therefore, according to the invention the required proportion of propellant is added to a melt to be foamed at a defined time over a defined period of time under a defined pressure.

The magnitude of the pressure exerted on the propellant during the metered addition is determined in particular in dependence on the required quantity of propellant, the type of article to be produced as well as the selected process parameters.

The present invention is explained in more detail below with reference to the figures on the basis of a preferred embodiment by the example of the addition of a compressible fluid. It goes without saying that the following explanation may also be applied in principle to non-compressible fluids such as water, for example.

FIGS. 1a–1d show the individual stages of the process according to the invention for the production of physically foamed injection moulded articles;

FIG. 2 schematically shows a device for executing the process according to the invention;

Figure 1A:
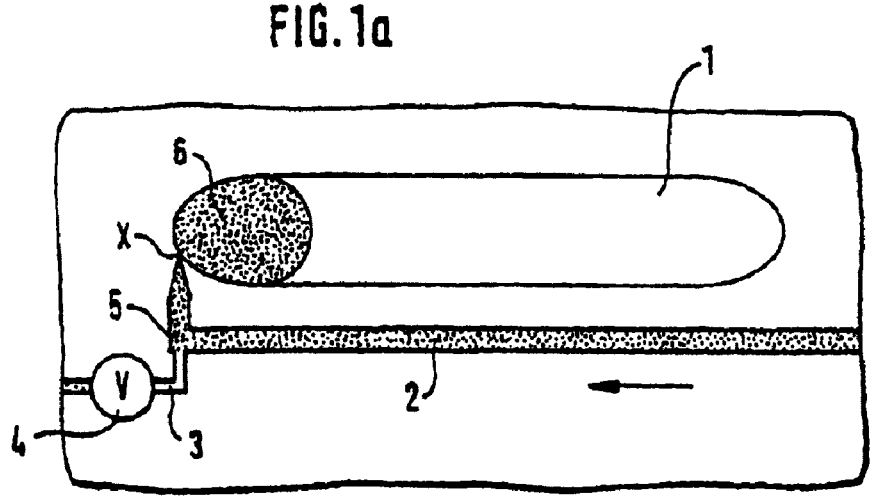
Figure 1B:
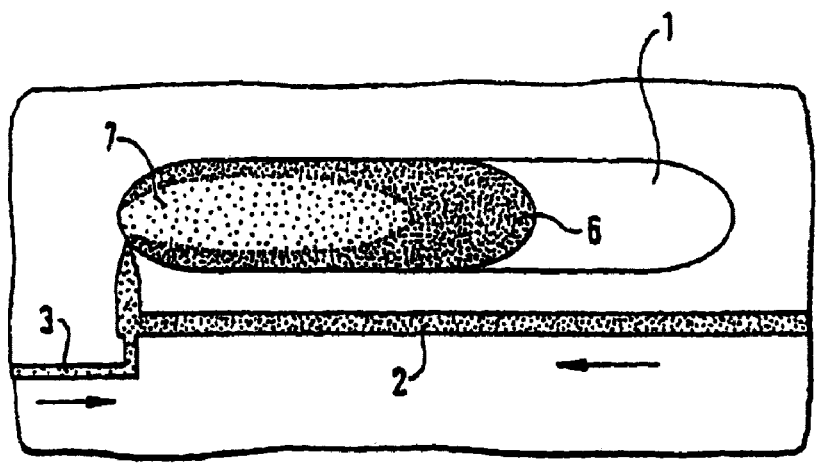
Figure 1C:
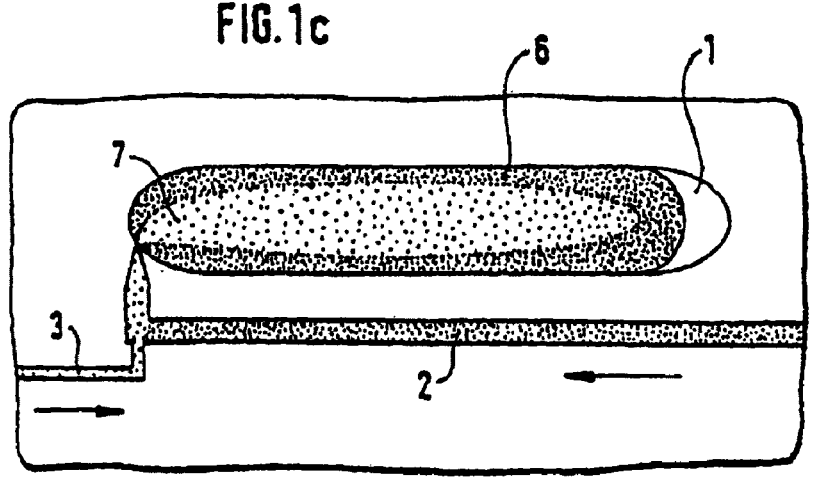

As FIG. 1a shows, the cavity 1 of any injection moulding plant is partially initially filled in a first stage firstly with compact propellant-free melt 6. In this case, the feed pipe 3 for a compressed propellant is closed, for example, by a valve 4 such as a pressure relief valve (overflow valve).

After the cavity 1 has been filled with a desired quantity of propellant-free melt 6, the feed pipe 3 for the propellant is opened and the propellant is injected in compressed, preferably liquid, state via the injection point 5. Through contact with the hot melt, the liquid propellant turns to gas and expands under the lower pressure in the cavity.

As a general rule the propellant is still liquid and not gaseous at the injection point 5 itself, and therefore one cannot talk of a "gasification point" in a narrower sense.

The mixture 7 of gaseous propellant and melt flows into the cavity 1 and causes the cavity 1 to fill completely, in which case the propellant-free melt portion 6 which was used for the initial filling comes to rest in the region of the cavity walls and forms the external skin or edge zone of the injection moulded article to be formed.

Figure 1D:
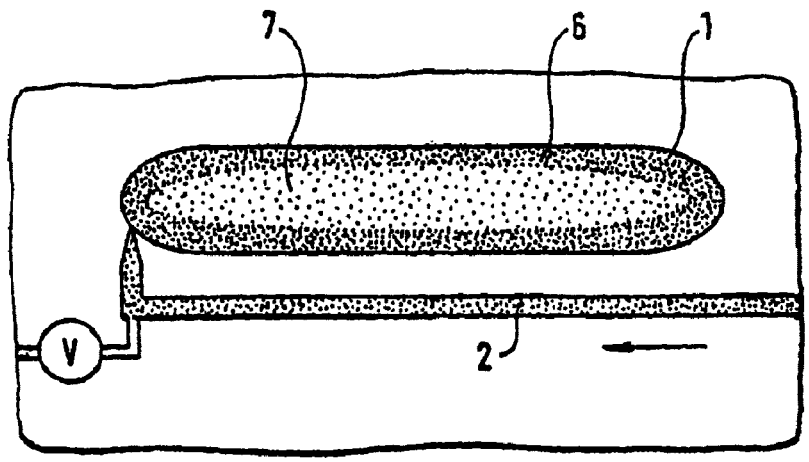

The cavity 1 can be ready filled as desired and required up to the maximum filling quantity with melt mixed with propellant or, as shown in FIG. 1D, propellant-free melt can again be fed to the cavity in a third stage. In this case a foamed article is obtained which has a compact firm external skin all around which is formed by propellant-free melt.

After foaming and hardening, the finished injection moulded article, e.g. made of integral foam, is removed from the cavity and the cavity is immediately available again for the next charge.

As shown in FIG. 1d, injection moulded articles, which have a cellular foamed internal core and a compact firm closed external skin, are obtained with the process according to the invention. Contrary to the known foaming processes, such as those described above, in which the cavity is filled completely with a melt/propellant mixture, according to the invention an initial filling with propellant-free melt occurs firstly, as a result of which the formation of a uniform closed compact external skin is effected and articles with excellent surface characteristics can be obtained.

It is essential for execution of the process to prevent premature expansion of the propellant held under pressure. This can be achieved by appropriate insulation of the device and/or maintaining a suitable pressure level.

The metered addition of the propellant is conducted in a time- and pressure-controlled manner for the process according to the invention. Control can be carried out via a device which is also the subject of the invention.

Figure 2:
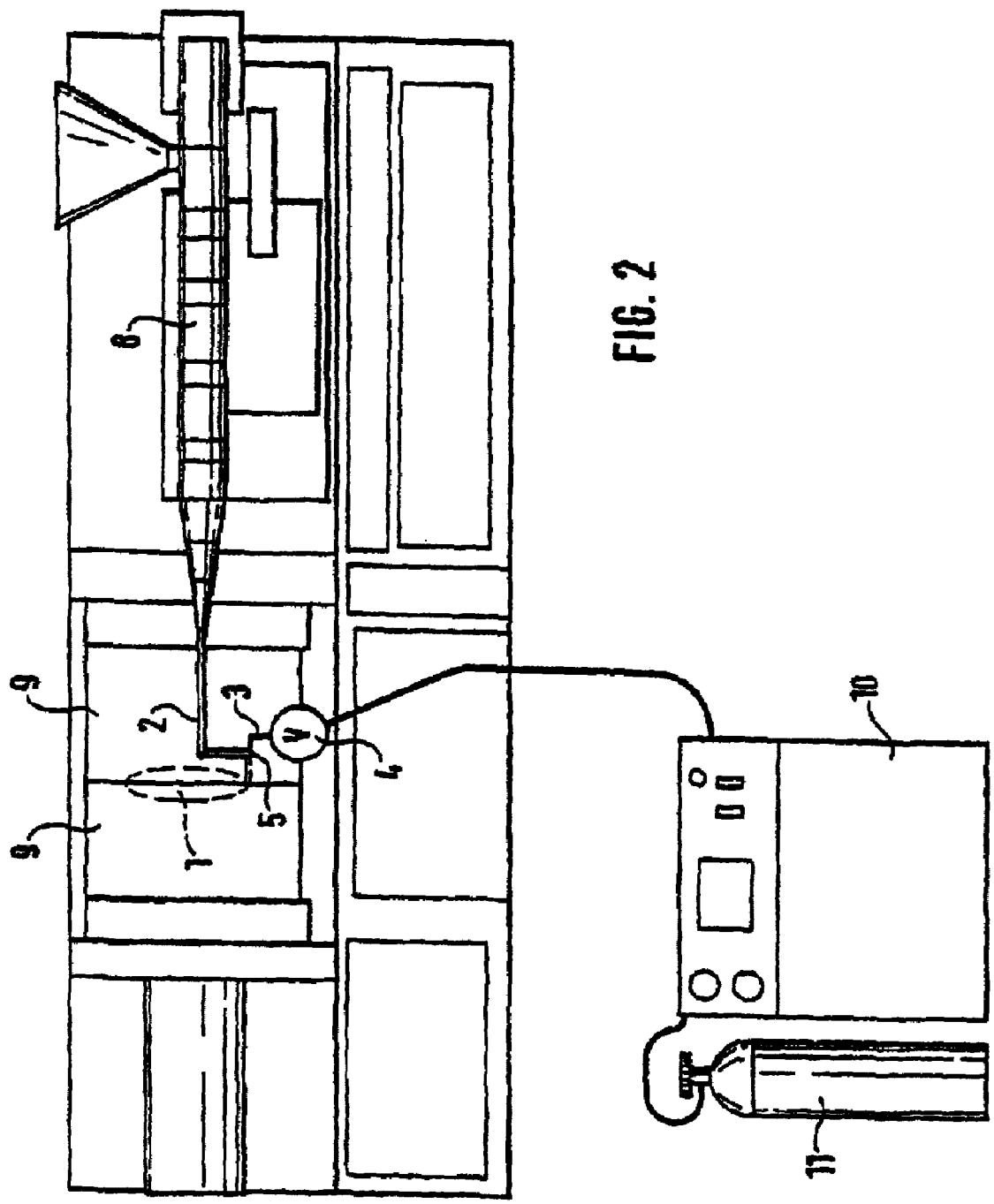

As shown in FIG. 2, the propellant stored under pressure in a storage means 11, e.g. a pressure cylinder etc., is fed to a pressure control valve 10, which can be a multi-way valve such as a 3/3- or 2/3-way proportional valve, and should advantageously have a very quick reaction time and precise regulation.

During the propellant injection phase, i.e. the phase in which the propellant is added to the melt, in the case of critical propellants, the compressed propellant passes via a pressure relief valve 4 to the injection point 5 and there is added to the melt.

In this case, the dimensions of the pipes, connection pieces and also the parts of the technical control system of the process are such that no premature expansion in volume of the propellant under pressure is possible.

In the case of a sudden increase in volume the aggregate state of the agent can change, i.e. the agent changes into a gas, in which case vaporisation cold is generated, which would in turn block the pipes as a result of "icing".

An increase in temperature on the way to the injection point 5 would also lead to a change in the aggregate state. For prevention, insulation of the heat-carrying elements is recommended.

In order to prevent premature expansion, all feed pipes should be as short as possible. Consequently, the pressure control valve 10 is preferably constructed to be as close as possible to the injection point 5. An improvement to the control characteristics of the control valve is also achieved as a result of the thus shortened feed pipe to the injection point 5.

If critical propellants are used, a pressure relief valve or overflow valve 4 is provided before the injection point 5, this valve ensuring that the pressure in the device does not drop below a specific value, preferably p (crit) at the given temperature, at which the transformation of the propellant into gas would take place. If, for example, carbon dioxide is used as propellant, a pressure of at least 60 bar should be maintained at room temperature in order to keep the carbon dioxide in the device upstream in liquid state.

The pressure relief valve 4 ensures that the propellant remains in compressed state even during outage times of the machine, e.g. in the intermediate cycle times before and after or between the propellant injection phases. A full release of pressure only occurs when the machine or control system is switched off. Several pressure relief valves with "falling" pressure values may also be provided so that a pressure gradient is formed in front of the injection point 5 in the feed pipe section between the pressure control valve 10 and the pressure relief valve 4.

Figure 3:
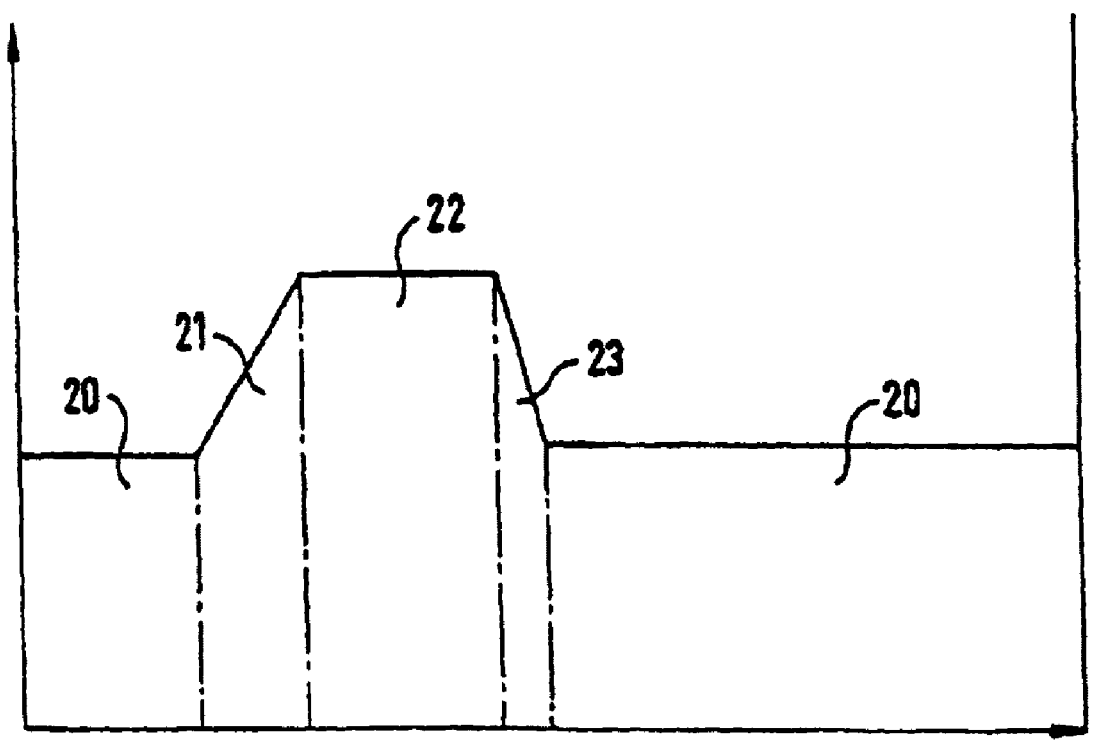
FIG. 3 is a graph showing the pressure curve during execution of the process.

The graph in FIG. 3 schematically shows the pressure curve for executing the process according to the invention using the example of compressible propellants.

Outside of the propellant injection phase, as in the intermediate cycle times, it is sufficient to keep the device at a selected pressure, at which the propellant respectively used remains in compressed, preferably liquid, state (section 20).

During the propellant injection phase (section 22), an elevated pressure is introduced in the feed pipes through the pressure control valve 10 so that the opening pressure (holding pressure) of the relief valve 4 is exceeded and the feed pipe section 3 up to the injection point 5 is quickly filled with liquid medium.

In this case, the pressure increase is proportional to the desired quantity of propellant to be fed to the melt. After time t expires, as soon as the desired quantity of propellant has been added to the melt, the pressure is reduced again to the starting pressure (section 24).

In FIG. 3, sections 21 and 23 show the pressure build up or reduction phase.

The injection point 5 is preferably configured as a throttle means, e.g. as a defined gap in an injector, a sintered metal injector or a needle valve. According to the invention, a controlled closure mechanism is located at the injection point. The quick pressure increase and the resistance through the injector prevent the propellant from transforming into gas, while the agent flows on from the pressure control valve 10.

The above measures ensure that the transformation of the agent into gas only occurs upon exit from the injector and when in contact with the hot melt, and that the inflowing melt is foamed.

The controlled closure mechanism can be omitted if a pressure relief valve is provided.

After the propellant injection phase has ended, i.e. after the desired quantity of propellant has been added to the melt, the pressure in the feed pipe to the injection point 5 is reduced so that no propellant can flow on. However, in the pipe up to the pressure relief valve 4 the starting pressure remains in order to keep the agent in compressed or liquid state for the next cycle. A virtually pressure-free and thus gaseous state prevails only in the short feed pipe section from the pressure relief valve 4 to the injection point 5 until the next cycle.

It goes without saying that this part of the plant may also be kept under pressure if required by the provision of a suitable closure mechanism which opens again at the beginning of the propellant injection phase as a result of the increasing pressure level.

The pressure control via the pressure control valve can occur automatically by providing pressure measurement points 12, 13, for example, in front of and behind the pressure control valve.

If carbon dioxide is used as propellant, for example, the plant is preferably held at an operating pressure of at least 60 bar at room temperature, so that the $CO_2$ also remains in compressed state during the periods between the propellant injection phases. At the beginning of the propellant injection phase, a desired working pressure of about 200 bar, for example, is built up (section 21) in order to assure an adequate flow of propellant to the melt. After the propellant injection phase 22 has ended, the pressure is reduced again to the desired operating pressure.

Figure 4A:
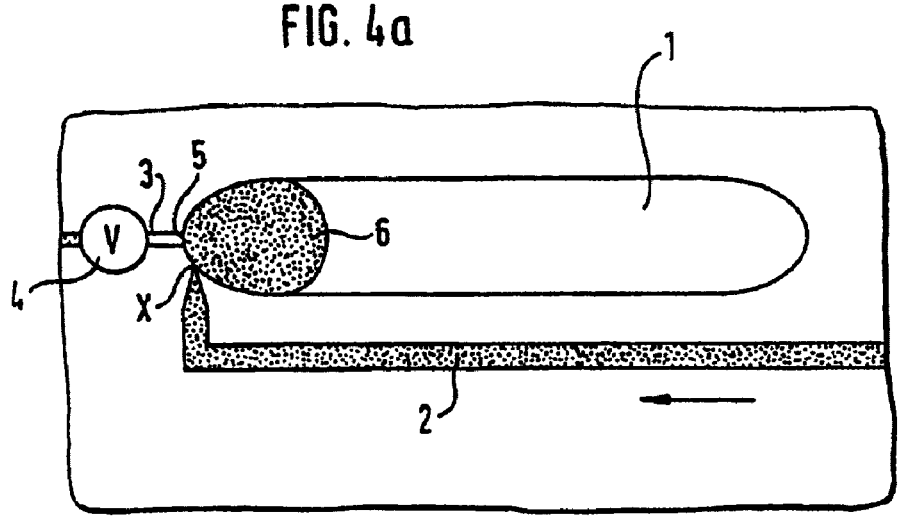
FIG. 4 shows a variant of FIG. 1 with direct introduction of the propellant into the cavity.
Figure 4B:
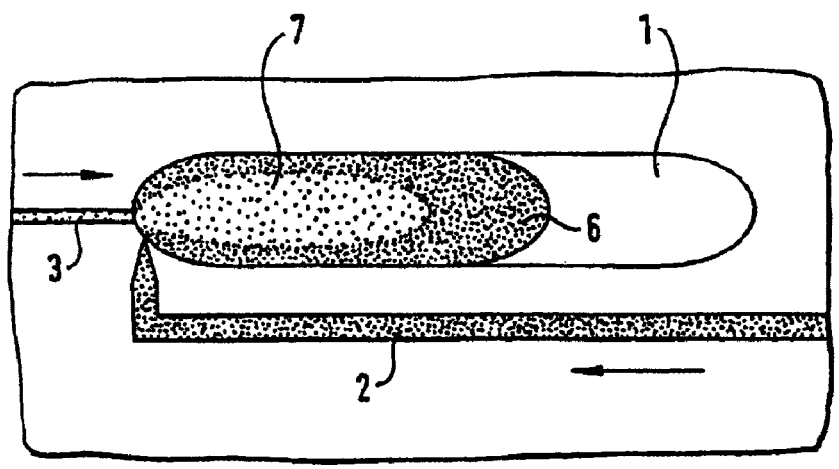

The injection point 5 is preferably located in the feeder pipe 3 close to the spray point x. According to a further embodiment, as is shown in FIG. 4, the propellant can be added directly to the melt in the cavity. In this case, the injection point 5 is located directly at the cavity.

In addition, the build up of a counterpressure can be provided in the cavity 1, such as is also used in conventional injection moulding processes in the so-called gas counterpressure process.

Very short cycle times can be obtained with the process according to the invention. Hence, the process according to the invention is also very well suited to the production of mass-produced articles. The short cycle times are supported by the vaporisation cold resulting upon the transformation of the propellant into gas, and this causes a reduction in the cooling time, and thus also the cycle time.

Should there still be propellant residues present in the pore structure in the core of the article after demoulding, these slowly diffuse out of the article without detriment to its usability or recyclability.

Excellent dimensional stability of the article is achieved as a result of its closed firm external skin. In addition, foamed injection moulded articles which have a homogeneous uniform external skin and excellent tactility can be obtained with the process according to the invention.

The foamed injection moulded articles obtained have an excellent surface quality and do not require any further finishing. It is also of advantage that the cavity does not need to be treated with a separating agent.

The process according to the invention for the pressure-controlled metered addition of physical propellants to an expandable melt can be conducted advantageously with a device comprising a storage means 11, in which the propellant is stored under pressure, a pressure control valve 10 for regulating the propellant pressure and an injection point 5, which is preferably configured as a throttle means, at which the propellant under pressure is added to the melt, wherein the injection point 5 includes a controlled closure mechanism, and in the case of critical propellants at least one pressure relief valve 4 is provided which is positioned downstream of the pressure control valve 10.

Although the above-described process and the device for the pressure-controlled metered addition of propellants under high pressure can be advantageously used for the production of physically foamed injection moulded articles, they are, of course, also suitable for other processes in which propellants are added under high pressure to melts to be expanded.

LIST OF REFERENCE NUMBERS

| | |
|---|---|
| 1 | cavity |
| 2 | melt feed |
| 3 | propellant feed pipe |
| 4 | pressure relief valve |
| 5 | injection point |
| 6 | propellant-free melt |
| 7 | melt with added propellant |
| 8 | injection of plastic material |
| 9 | mould comprising two halves |
| 10 | pressure control valve |
| 11 | propellant storage means |
| x | spray point |
| Section 20 | pressure during the intermediate cycle times |
| Section 21 | pressure build up phase |
| Section 22 | propellant injection phase |
| Section 23 | pressure reduction phase |

The invention claimed is:

1. A process for the production of physically foamed injection molded articles, wherein in a first stage a propellant-free first melt portion is fed into a cavity (initial filling), in a second stage adding a quantity of a physical propellant at elevated pressure to a second melt portion (propellant injection phase) and injecting the second melt portion containing the quantity of propellant into the cavity and optionally in a third stage a propellant-free third melt portion is charged into the cavity, the production of the injection molded articles occurring in the cavity;

wherein metering of the quantity of the physical propellant in the second stage occurs in a pressure regulated manner, wherein the pressure which is exerted on the propellant during the propellant injection phase is greater than the pressure which is exerted on the propellant in the phases between or before or after metered addition, and the expansion of the quantity of the propellant added to the melt occurs in the cavity including maintaining the propellant under pressure an intermediate cycle time before and after the propellant injection phase;

maintaining the propellant at a pressure of at least p (crit) at a given temperature during the intermediate cycle time.

2. A process for the production of physically foamed injection molded articles, wherein in a first stage a propellant-free first melt portion is fed into a cavity (initial filling), in a second stage adding a quantity of a physical propellant at elevated pressure to a second melt portion (propellant injection phase) and injecting the second melt portion containing the quantity of propellant into the cavity and optionally in a third stage a propellant-free third melt portion is charged into the cavity, the production of the injection molded articles occurring in the cavity;

wherein metering of the quantity of the physical propellant in the second stage occurs in a pressure regulated manner, wherein the pressure which is exerted on the propellant during the propellant injection phase is greater than the pressure which is exerted on the propellant in the phases between or before or after metered addition, and the expansion of the quantity of the propellant added to the melt occurs in the cavity of using a gas or gas mixture as the propellant;
wherein the gas or gas mixture is held in an intermediate cycle time at a pressure of at least 60 bar.

3. A process for the production of physically foamed injection molded articles, wherein in a first stage a propellant-free first melt portion is fed into a cavity (initial filling), in a second stage adding a quantity of a physical propellant at elevated pressure to a second melt portion (propellant injection phase) and injecting the second melt portion containing the quantity of propellant into the cavity and optionally in a third stage a propellant-free third melt portion is charged into the cavity, the production of the injection molded articles occurring in the cavity;
wherein metering of the quantity of the physical propellant in the second stage occurs in a pressure regulated manner, wherein the pressure which is exerted on the propellant during the propellant injection phase is greater than the pressure which is exerted on the propellant in the phases between or before or after metered addition, and the expansion of the quantity of the propellant added to the melt occurs in the cavity
further comprising the step of elevating the pressure of the propellant during the propellant injection phase to a pressure of over 60 bar using a pressure control valve.

4. A process for the production of physically foamed, injection molded articles in a mold cavity, comprising the steps of:
in a first stage is an initial filling step, feeding a propellant-free first melt portion into the mold cavity;
in a second stage, in a propellant injection phase, concurrently injecting into the mold cavity a physical propellant maintained at an elevated pressure and a second melt portion;
metering the physical propellant in the second stage in a pressure regulated manner;
wherein the pressure which is directly exerted on the propellant alone during the propellant injection phase is greater than the pressure exerted on the propellant in the phases before and after said metering.

5. The process of claim 4, further comprising the step of controlling the pressure exerted on the propellant via a pressure control valve.

6. The process of claim 5, wherein the pressure control valve is a multi-way valve.

7. The process of claim 6, wherein the multi-way valve is a 3/3-way proportional valve or a 2/3-way proportional valve.

8. The process of claim 4 further comprising the step of controlling the pressure of a critical propellant via at least one pressure relief valve connected downstream of a pressure control valve.

9. The process of claim 8, wherein at least one of the pressure relief valves has a holding pressure equal to or higher than the pressure at which a critical propellant is held in an intermediate cycle time.

10. The process of claim 4, wherein the propellant is a compressible fluid.

11. The process of claim 4 further comprising the step of maintaining the propellant under pressure in an intermediate cycle time before and after the propellant injection phase.

12. The process of claim 4 further comprising the step of using water as the propellant.

13. The process of claim 4 further comprising the step of using a gas or gas mixture as the propellant.

14. The process of claim 13, further comprising the step of using carbon dioxide as the propellant.

15. The process of claim 4 further comprising the step of generating a counterpressure in the cavity.

16. The process of claim 4, wherein the physically foamed injection molded article is selected from the group consisting of a handle, a knob, a gearshift knob, a steering wheel casing, a ball, a sphere, a fender, a float and a closing means for bottle-like containers.

17. The process of claim 4, wherein the step of concurrently injecting includes injecting at an injection point.

18. The process of claim 17, wherein said injection point is upstream of said mold cavity.

19. The process of claim 17, wherein said injection point is at said mold cavity.

20. The process of claim 17, including providing a controlled closure mechanism at the injection point, the controlled closure mechanism opening upon an increase in pressure exerted on the propellant upstream of the controlled closure mechanism above its holding pressure.

21. The process of claim 17, wherein the injection point is configured as a throttle means.

22. The process of claim 21, wherein the injection point is in the form of a defined gap in an injector or of an injector with a sinter metal.

23. The process of claim 21, wherein the injection point is configured as a controlled closure mechanism.

24. The process of claim 4 further comprising the step of elevating the pressure of the propellant during the propellant injection phase to a pressure of over 60 bar using an upstream pressure control valve.

25. The process of claim 4 further including in a third stage, a propellant free third melt portion charged into the cavity.

26. A device for the discontinuous metered addition of physical propellants to a foamable melt, comprising:
a storage means, in which the propellant is stored under pressure,
a pressure control valve for regulating the propellant pressure, and
an injection point, which is configured as a throttle means, at which the propellant under pressure is fed to the melt,
wherein a controlled closure mechanism is provided at the injection point, and the controlled closure mechanism opens upon an increase in pressure exerted on the propellant upstream of the controlled closure mechanism above its holding pressure
wherein the injection point for the propellant is upstream to the spray point x within the mold and the part of the feeder pipe between the injection point and the spray point x is designed such that premature expansion in volume of the propellant under pressure is avoided.

27. The device of claim 26, further comprising at least one pressure relief valve.

28. A device for the discontinuous of physical propellants to a foamable melt, comprising:
a storage means, in which the propellant is stored under pressure,
a pressure control valve for regulating the propellant pressure, and
an injection point, which is configured as a throttle means, at which the propellant under pressure is fed to the melt,
wherein at least one pressure relief valve is provided before the injection point, and the pressure relief valve opens upon a pressure increase exerted on the propellant upstream of the pressure relief valve above its holding pressure wherein the injection point for the propellant is upstream to the spray point x within the mold and the part of the feeder pipe between the injection point and the spray point x is designed such that premature expansion in volume of the propellant under pressure is avoided.

* * * * *